(12) United States Patent
Kee et al.

(10) Patent No.: US 10,698,240 B2
(45) Date of Patent: Jun. 30, 2020

(54) FLEXIBLE DISPLAY DEVICE

(71) Applicant: Samsung Display Co., Ltd., Yongin (KR)

(72) Inventors: In Seo Kee, Seongnam-si (KR); Soyoun Jung, Seoul (KR); Hoonsik Kim, Seongnam-si (KR); Dongwoo Seo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 848 days.

(21) Appl. No.: 14/579,491

(22) Filed: Dec. 22, 2014

(65) Prior Publication Data

US 2015/0201487 A1 Jul. 16, 2015

(30) Foreign Application Priority Data

Jan. 13, 2014 (KR) ........................ 10-2014-0004091

(51) Int. Cl.
*H05K 1/02* (2006.01)
*G02F 1/1333* (2006.01)

(52) U.S. Cl.
CPC .... *G02F 1/133305* (2013.01); *G02F 1/13338* (2013.01); *B32B 2457/20* (2013.01); *B32B 2457/202* (2013.01); *B32B 2457/206* (2013.01); *B32B 2457/208* (2013.01); *G01N 2203/0075* (2013.01); *G02F 2001/133331* (2013.01); *G02F 2202/28* (2013.01); *Y10T 428/1036* (2015.01); *Y10T 428/1059* (2015.01)

(58) Field of Classification Search
CPC ........... G02F 1/133305; G02F 1/13338; G02F 2001/133331; G02F 2202/28; G01N 2203/0075; Y10T 428/1036; Y10T 428/1059; B32B 2457/20; B32B 2457/202; B32B 2457/206; B32B 2457/208
See application file for complete search history.

(56) References Cited

U.S. PATENT DOCUMENTS

| | | | |
|---|---|---|---|
| 7,955,703 B2 | 6/2011 | Arai et al. | |
| 8,345,193 B2 | 1/2013 | Miyazaki et al. | |
| 9,864,409 B2* | 1/2018 | Lee | ........................ G06F 1/1652 |

(Continued)

FOREIGN PATENT DOCUMENTS

| | | |
|---|---|---|
| JP | 2009-242786 | 10/2009 |
| JP | 4993245 | 8/2012 |

(Continued)

OTHER PUBLICATIONS

Gandhi, et al., "Beams with Controllable Flexural Stiffness," Proceedings of SPIE, Active and Passive Smart Structures and Integrated Systems, Jun. 29, 2007, vol. 6525, pp. 652511-1-652511-8.

*Primary Examiner* — Eli D. Strah
(74) *Attorney, Agent, or Firm* — H.C. Park & Associates, PLC

(57) ABSTRACT

A flexible display device includes a flexible display panel, a flexible outer member disposed on the flexible display panel, and an adhesive member disposed between the flexible display panel and the flexible outer member. An elastic modulus of the adhesive member is from about $1/1000000$ to about $1/1000$ of an elastic modulus of each of the flexible display panel and the flexible outer member.

5 Claims, 9 Drawing Sheets

(56) References Cited

U.S. PATENT DOCUMENTS

| | | | |
|---|---|---|---|
| 2006/0098153 A1* | 5/2006 | Slikkerveer | G02F 1/133305 349/187 |
| 2006/0132025 A1* | 6/2006 | Gao | H01L 51/52 313/503 |
| 2006/0132030 A1* | 6/2006 | Gao | H01L 51/5237 313/511 |
| 2006/0204675 A1* | 9/2006 | Gao | G02F 1/133305 428/1.1 |
| 2009/0068459 A1 | 3/2009 | Kishioka et al. | |
| 2010/0003481 A1 | 1/2010 | Nakabayashi et al. | |
| 2010/0066970 A1* | 3/2010 | Miyazaki | G06K 19/077 349/158 |
| 2010/0110354 A1 | 5/2010 | Suzuki et al. | |
| 2011/0033720 A1 | 2/2011 | Fujita et al. | |
| 2014/0240985 A1* | 8/2014 | Kim | H05K 1/028 362/249.04 |
| 2014/0367644 A1* | 12/2014 | Song | H01L 51/0097 257/40 |
| 2015/0310776 A1* | 10/2015 | Lee | G06F 1/1652 345/173 |
| 2015/0346408 A1* | 12/2015 | Mizutani | C09J 133/08 428/41.5 |

FOREIGN PATENT DOCUMENTS

| | | | | |
|---|---|---|---|---|
| KR | 10-2005-0085066 | 8/2005 | | |
| KR | 10-0911476 | 8/2009 | | |
| KR | 10-1155907 | 6/2012 | | |
| WO | WO-2014091863 A1 * | 6/2014 | | H01L 51/5281 |
| WO | WO-2014137113 A1 * | 9/2014 | | G06F 1/1652 |

\* cited by examiner

FLEXIBLE DISPLAY DEVICE

CROSS-REFERENCE TO RELATED APPLICATION

This U.S. non-provisional patent application claims priority under 35 U.S.C. § 119 of Korean Patent Application No. 10-2014-0004091, filed on Jan. 13, 2014, which is hereby incorporated by reference for all purposes as if fully set forth herein.

BACKGROUND

Field

The present disclosure relates to a flexible display device. More particularly, the present disclosure relates to a flexible display device capable of reducing defects.

Discussion of the Background

In recent years, a curved display device (hereinafter, referred to as a flexible display device) has been developed. The flexible display device includes a flexible display panel and various outer members.

The outer members serve different purposes. The outer members are disposed on at least one or two opposing surfaces of the flexible display panel and are bendable to match the curvature of the flexible display panel.

The above information in this Background section is only for enhancement of understanding of the background of the invention and, therefore, it may contain information that does not constitute prior art.

SUMMARY

The present disclosure provides a flexible display device having reduced strain during use.

Embodiments of the inventive concept provide a flexible display device including a flexible display panel, a flexible outer member disposed on the flexible display panel, and an adhesive member disposed between the flexible display panel and the flexible outer member. An elastic modulus of the adhesive member is from about $1/1000000$ to about $1/1000$ of an elastic modulus of each of the flexible display panel and the flexible outer member.

When the flexible display device is bent, different neutral planes are respectively defined in the flexible display panel and the flexible outer member. A compressive stress applied to the neutral plane defined in the display panel is substantially equal to a tensile stress applied to the neutral plane defined in the display panel, and a compressive stress applied to the neutral plane defined in the outer member is substantially equal to a tensile stress applied to the neutral plane defined in the outer member.

Exemplary embodiments of the inventive concept provide a flexible display device including an adhesive member having an elastic modulus of about 0.01 MPa to about 1 MPa, a flexible display panel having an elastic modulus of about 1 GPa to about 10 GPa, and a flexible outer member having an elastic modulus of about 2 GPa to about 7 GPa.

Exemplary embodiments of the inventive concept provide a flexible display device including a flexible display panel, flexible outer members disposed on the flexible display panel, and an adhesive member disposed every between two adjacent outer members to each other among the flexible display panel and the flexible outer members. The adhesive member has an elastic modulus of about $1/1000000$ to about $1/1000$ of an elastic modulus of each of the two adjacent outer members to each other.

According to the above, when the flexible display device is bent, different neutral planes are respectively defined in the flexible display panel and the flexible outer member. This is because the flexible display panel and the flexible outer member are partially decoupled from each other by the stress applied to the adhesive member, when the flexible display device is bent.

When the flexible display device is bent, the flexible display panel and the flexible outer member have independent strains. The strains of the flexible display panel and the flexible outer member are small in consideration of the thickness of the flexible display device. Each of the flexible display panel and the flexible outer member has the strain corresponding to its thickness. Accordingly, although the flexible display device is bent, internal components of the flexible display panel and the flexible outer member are not damaged. In addition, the flexible display panel and the flexible outer member are not physically decoupled from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention. The above and other advantages of the present disclosure will become readily apparent by reference to the following detailed description when considered in conjunction with the accompanying drawings.

DETAILED DESCRIPTION

Figure 1:
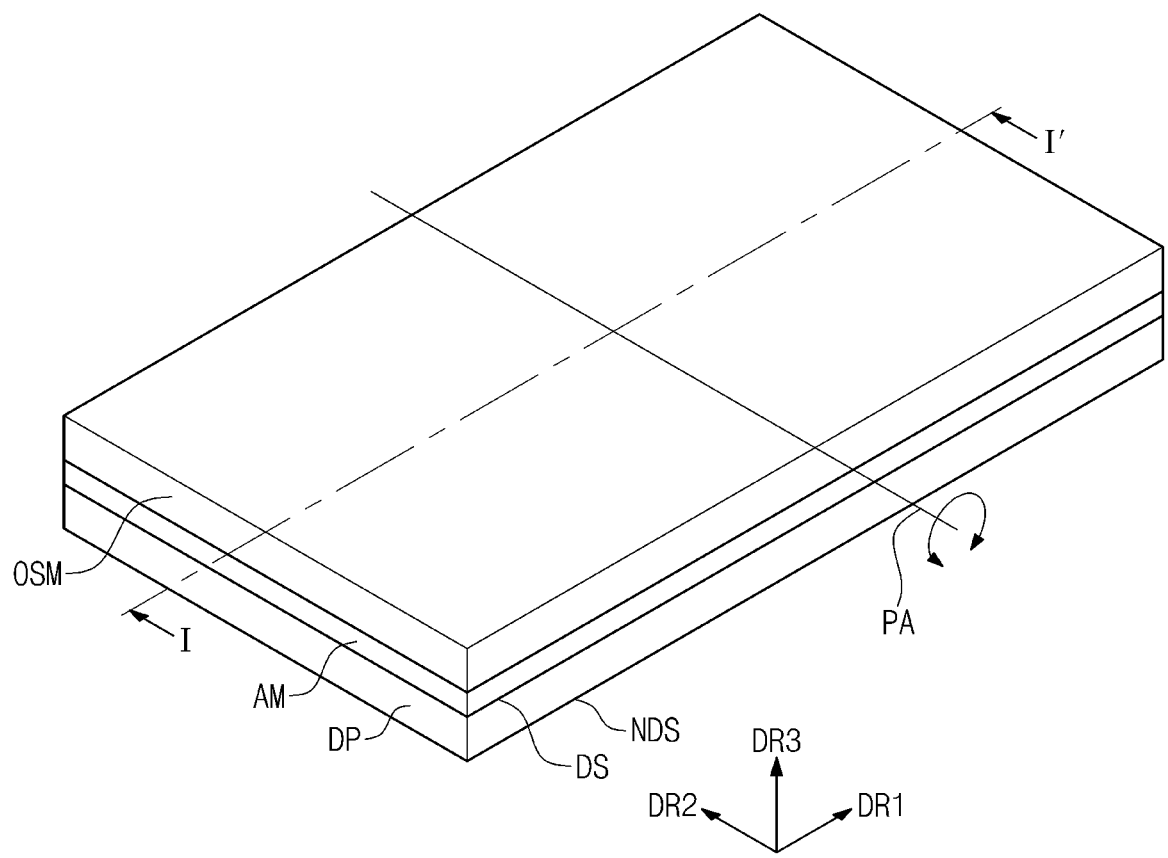
FIG. 1 is a perspective view showing a flexible display device that is in an unfolded state, according to an exemplary embodiment of the present disclosure.

Aspects of the present disclosure are described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a perspective view showing a flexible display device that is unfolded according to an exemplary embodiment of the present disclosure. The flexible display device may be curved or rolled over the entire area thereof, or may be bent in a specific area thereof.

Referring to FIG. 1, the flexible display device (hereinafter, referred to as a display device) includes a flexible display panel DP (hereinafter, referred to as a display panel) and an outer member OSM disposed on the display panel DP. The display panel DP and the outer member OSM are coupled to each other by an adhesive member AM.

The display panel DP includes a display surface DS defined by a first direction DR1 and a second direction DR2. The display panel DP displays an image through the display surface DS. FIG. 1 shows the display panel DP including the display surface DS as a representative example.

The adhesive member AM is disposed on the display surface DS. The outer member OSM is disposed on the adhesive member AM. The display panel DP and the outer member OSM are spaced apart from each other in a thickness direction DR3 (hereinafter, referred to as a third direction DR3), such that the adhesive member AM is disposed between the display panel DP and the outer member OSM. According to another exemplary embodiment, the outer member OSM may be disposed on a non-display surface NDS facing the display surface DS.

The outer member OSM may include at least one of a touch screen panel, an optical member, a window member, and a protective member. The touch screen panel, the optical member, the window member, and the protective member may be stacked in the third direction DR3.

The adhesive member AM may be an adhesive layer manufactured by coating an liquid adhesive material, which is then cured, or may be a separately manufactured adhesive sheet. For instance, the adhesive member AM may be a pressure sensitive adhesive sheet. The pressure sensitive adhesive sheet includes a polymer, a cross-linking agent, and a resin. The polymer may include one or more of an acryl-based polymer, a silicon-based polymer, and a urethane-based polymer.

The display panel DP includes a flexible base substrate (not shown), signal lines (not shown) disposed on the base substrate, and pixels (not shown) electrically connected to the signal lines. The pixels generate the image on the basis of signals provided through the signal lines. The display panel DP may be an organic light emitting display panel, an electrophoretic display panel, or an electrowetting display panel.

The display device is bent along a bending axis PA. The bending axis PA is an imaginary axis extending in the second direction DR2. When the display device is bent, stress occurs in the display device.

The display panel DP, the adhesive member AM, and the outer member OSM have different elastic modulus (or Young's modulus). Each of the display panel DP, the adhesive member AM, and the outer member OSM is deformed to correspond to its elastic modulus by the stress occurring when the display device is bent.

Each of the display panel DP, the adhesive member AM, and the outer member OSM has the elastic modulus determined depending on its layer structure and/or material composition. Hereinafter, a relation between the layer structure of the display panel DP and the elastic modulus of the display panel DP will be described in detail.

Figure 2:
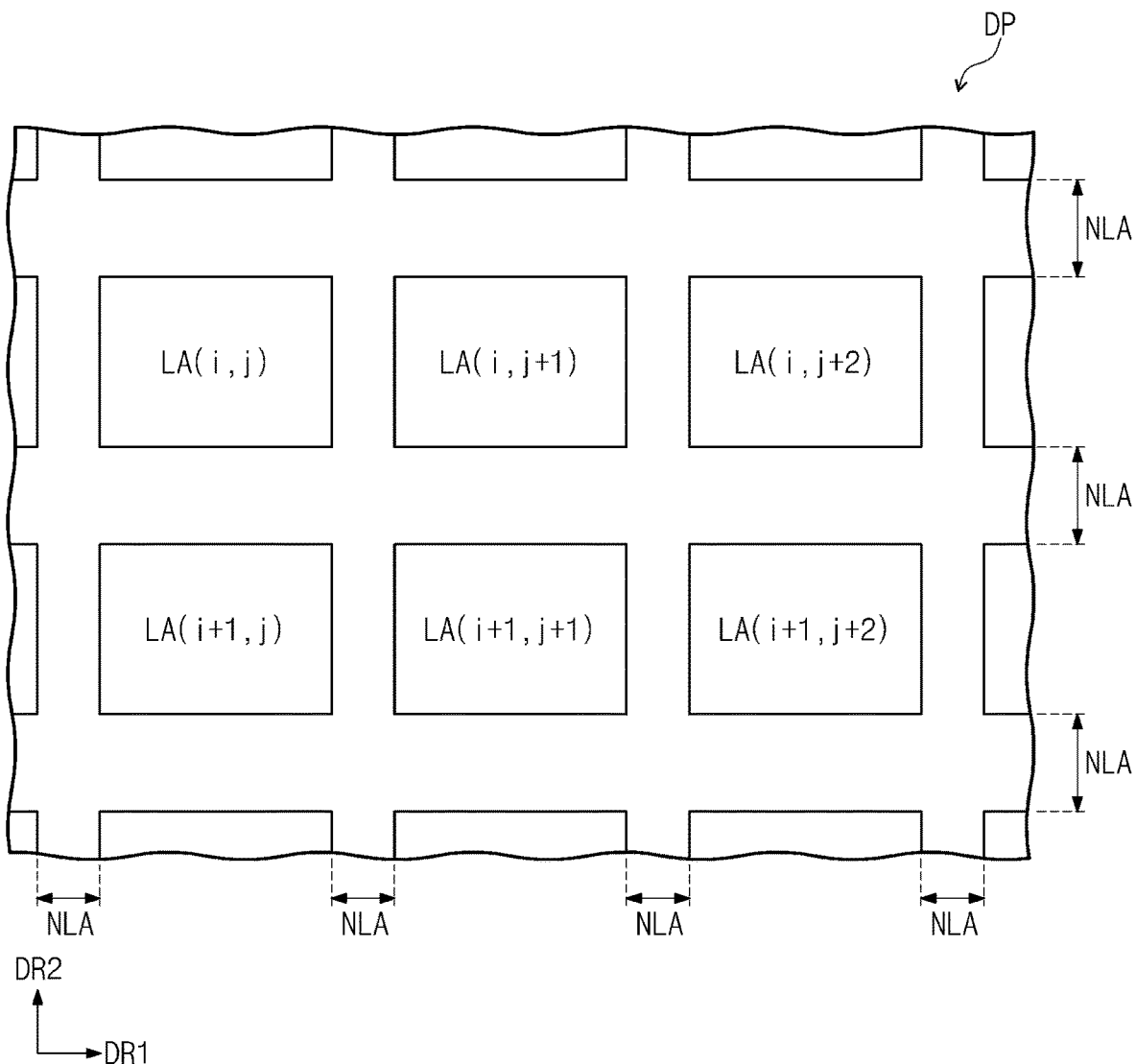
FIG. 2 is a plan view showing a flexible display panel according to an exemplary embodiment of the present disclosure.
Figure 3:
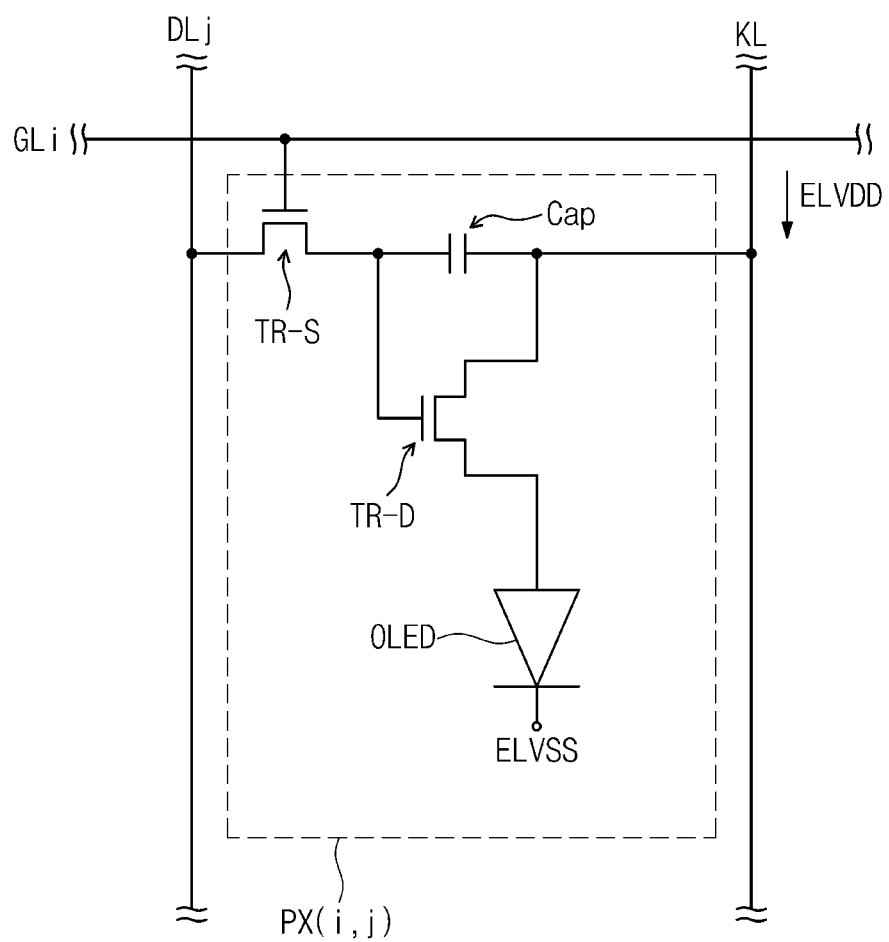
FIG. 3 is an equivalent circuit diagram showing a pixel according to an exemplary embodiment of the present disclosure.
Figure 4:
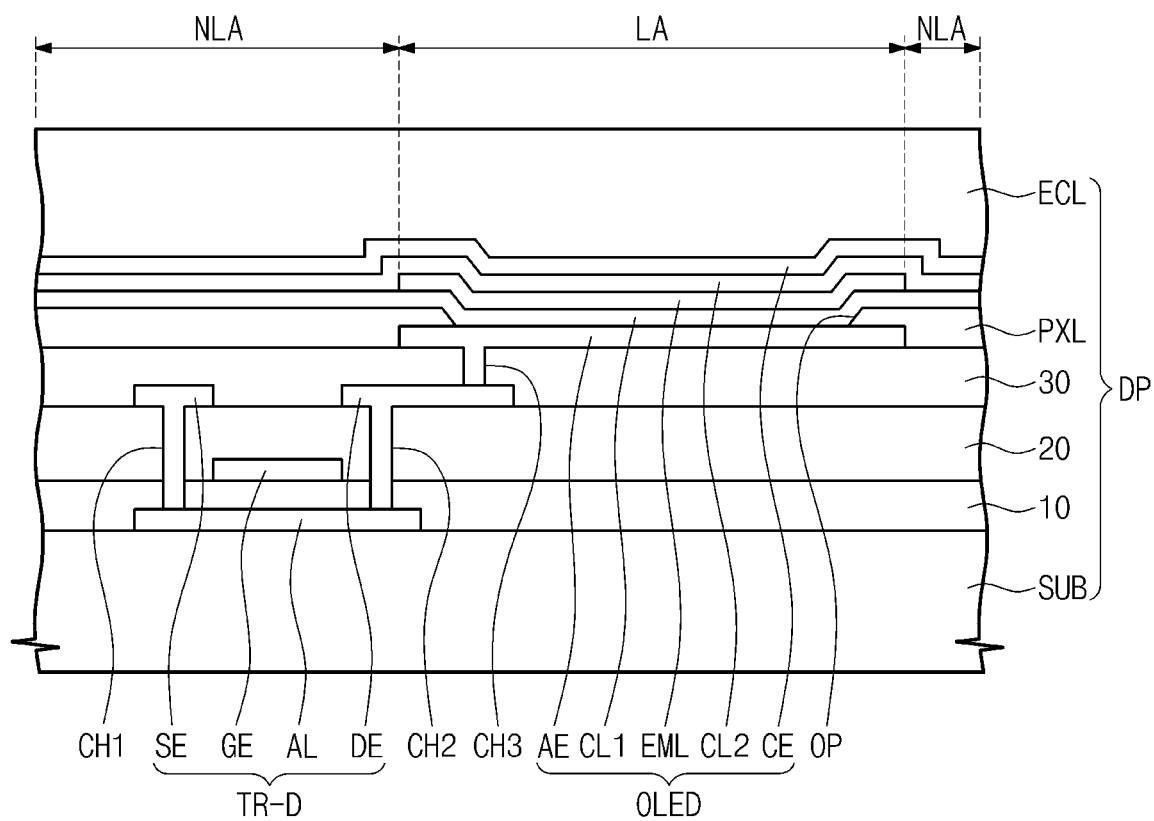
FIG. 4 is a cross-sectional view showing a pixel according to an exemplary embodiment of the present disclosure.

FIG. 2 is a plan view showing a flexible display panel according to an exemplary embodiment of the present disclosure, FIG. 3 is an equivalent circuit diagram showing a pixel according to an exemplary embodiment of the present disclosure, and FIG. 4 is a cross-sectional view showing a pixel according to an exemplary embodiment of the present disclosure. FIGS. 2 to 4 show the organic light emitting display panel.

Referring to FIG. 2, the display panel DP includes a plurality of light emitting areas LA(i, j) to LA(i−1, j+2) and a non-light emitting area NLA surrounding the light emitting areas LA(i, j) to LA(i−1, j+2). FIG. 2 shows six light emitting areas LA(i, j) to LA(i+1, j+2), as a representative example.

Display elements (not shown) of the pixels (not shown) are disposed to overlap the light emitting areas LA(i, j) to LA(i+1, j+2), respectively, when viewed in a plan view. Circuit parts (not shown) of the pixels are disposed to overlap with the non-light emitting area NLA, when viewed in a plan view. In addition, the signal lines are disposed to overlap with the non-light emitting area NLA, when viewed in a plan view.

FIG. 3 shows the equivalent circuit diagram of the pixel PX(i, j). The pixel PX(i, j) receives a gate signal from an i-th gate line GLi and a data signal from a j-th data line DLj. The pixel PX(i, j) receives a first source voltage ELVDD from a source voltage line KL.

The pixel PX(i, j) includes an organic light emitting diode OLED connected to second source voltage ELVSS as the display element. The pixel PX(i, j) includes a switching thin film transistor TR-S, a driving thin film transistor TR-D, and a capacitor Cap, as a circuit part to drive the organic light emitting diode OLED.

The switching thin film transistor TR-S outputs the data signal applied to the j-th data line DLj, in response to the gate signal applied to the i-th gate line GLi. The capacitor Cap is charged with a voltage corresponding to the data signal provided from the switching thin film transistor TR-S.

The driving thin film transistor TR-D is connected to the organic light emitting diode OLED. The driving thin film transistor TR-D controls a driving current flowing through the organic light emitting diode OLED, in response to the amount of electric charge stored in the capacitor Cap. The organic light emitting diode OLED emits the light during the turn-on period of the driving thin film transistor TR-D.

FIG. 4 shows a cross-sectional view of a portion of the equivalent circuit shown in FIG. 3. Referring to FIG. 4, insulating layers 10, 20, and 30, the driving thin film transistor TR-D, and the organic light emitting diode OLED are disposed on the base substrate SUB.

The base substrate SUB includes a flexible plastic substrate. A semiconductor pattern AL of the driving thin film transistor TR-D is disposed on the base substrate SUB. A first insulating layer 10 is disposed on the base substrate SUB to cover the semiconductor pattern AL. The first insulating layer 10 includes an organic layer and/or an inorganic layer. The first insulating layer 10 may include a plurality of thin layers.

A control electrode GE (or gate electrode) of the driving thin film transistor TR-D is disposed on the first insulating layer 10. The second insulating layer 20 is disposed on the first insulating layer 10 to cover the control electrode GE. The second insulating layer 20 includes an organic layer and/or an inorganic layer. The second insulating layer 20 may include a plurality of thin layers.

An input electrode SE (or source electrode) and an output electrode DE (or drain electrode) of the driving thin film transistor TR-D are disposed on the second insulating layer 20. The input electrode SE and the output electrode DE are connected to the semiconductor pattern AL respectively through a first contact hole CH1 and a second contact hole CH2 respectively. The first contact hole CH1 and the second contact hole CH2 are formed through the first and second insulating layers 10 and 20. According to another embodiment, the driving thin film transistor TR-D may have a bottom gate structure.

The third insulating layer 30 is disposed on the second insulating layer 20 to cover the input electrode SE and the output electrode DE. The third insulating layer 30 includes an organic layer and/or an inorganic layer. The third insulating layer 30 may include a plurality of thin layers.

A pixel definition layer PXL and the organic light emitting diode OLED are disposed on the third insulating layer 30. The organic light emitting diode OLED includes an anode AE, a first common layer CL1, an organic light emitting layer EML, a second common layer CL2, and a cathode CE, which are sequentially stacked one on another. The anode AE is connected to the output electrode DE through a third contact hole CH3 formed through the third insulating layer 30. Positions of the anode AE and the cathode CE may be changed with respect to each other, according to the light emission direction of the organic light emitting diode OLED, and positions of the first and second common layers CL1 and CL2 may be changed with respect to each other.

The anode AE is disposed on the second insulating layer 30. The pixel definition layer PXL is provided with an opening OP formed to expose a portion of the anode AE. The area in which the anode AE is disposed is defined as a light emitting area LA. The first common layer CL1 is disposed on the anode AE. The common layer CL1 is disposed not only in the light emitting area LA, but also in the non-light emitting area NLA adjacent to the light emitting area LA. The first common layer CL1 includes a hole injection layer. The first common layer CL1 may further include a hole transport layer.

The organic light emitting layer EML is disposed on the first common layer CL1. The organic light emitting layer EML is disposed only in an area corresponding to the opening OP. The second common layer CL2 is disposed on the light emitting layer EML. The second common layer CL2 includes an electron injection layer. The second common layer CL2 may further include an electron transport layer. The cathode CE is disposed on the second common layer CL2. The cathode CE is disposed not only in the light emitting area LA, but also in the non-light emitting area NLA.

A sealing layer ECL is disposed on the cathode CE. The sealing layer ECL is overlapped with the light emitting area LA and the non-light emitting area NLA. The sealing layer ECL includes an organic layer and/or an inorganic layer. According to another embodiment, a fourth insulating layer (not shown) may be further disposed between the cathode CE and the sealing layer ECL to provide a planarized surface. In addition, the sealing layer ECL may be replaced with a sealing substrate.

Although not shown in figures, the switching thin film transistor TR-S may have the same structure as that of the driving thin film transistor TR-D. In addition, two electrodes of the capacitor Cap may be disposed on the first, second, and third insulating layers 10, 20, and 30.

The elastic modulus of the display panel DP is determined depending on the elastic modulus of each of the base substrate SUB, the first insulating layer 10, the second insulating layer 20, the third insulating layer 30, and the sealing layer ECL. The elastic modulus of the display panel DP, which is calculated on the basis of the elastic modulus of each of the base substrate SUB, the first insulating layer 10, the second insulating layer 20, the third insulating layer 30, and the sealing layer ECL, is in a range from about 1 GPa to about 10 GPa. According to some embodiments, the elastic modulus of the display panel DP may be in a range from about 4 GPa to about 6.5 GPa.

The elastic modulus of the adhesive member AM is determined according to its composition and/or composition ratio. For example, the elastic modulus of the pressure sensitive adhesive sheet is changed depending on the composition ratio of the polymer, the cross-linking agent, and the resin. The elastic modulus of the adhesive member AM is in a range from about 0.01 MPa to about 1 MPa.

The elastic modulus of the adhesive member AM may be set to be in the above-mentioned range at a temperature from about −45° C. to about 90° C., by adjusting the composition ratio of the polymer, the cross-linking agent, and the resin.

The elastic modulus of the outer member OSM may set based on the layer structure and the material of the outer member OSM. In other words, the touch screen, the optical member, the window member, and the protective member may have different elastic modulus. In the present exemplary embodiment, the elastic modulus of the outer member OSM may be in a range from about 1 GPa to about 10 GPa, regardless of what type of outer member is included. For example, the elastic modulus of the outer member OSM may be in a range from about 2 GPa to about 7 GPa.

According to the present exemplary embodiment, the elastic modulus of the adhesive member AM may be in a range from about 1/1000000 to about 1/1000, with respect to the elastic modulus of the display panel DP and/or the outer member OSM. Particularly, the elastic modulus of the adhesive member AM may be in a range from about 1/600000 to about 1/4000, with respect to the elastic modulus of the display panel DP. In addition, the elastic modulus of the adhesive member AM may be in a range from about 1/700000 to about 1/2000 with respect to the elastic modulus of the outer member OSM.

Figure 5A:
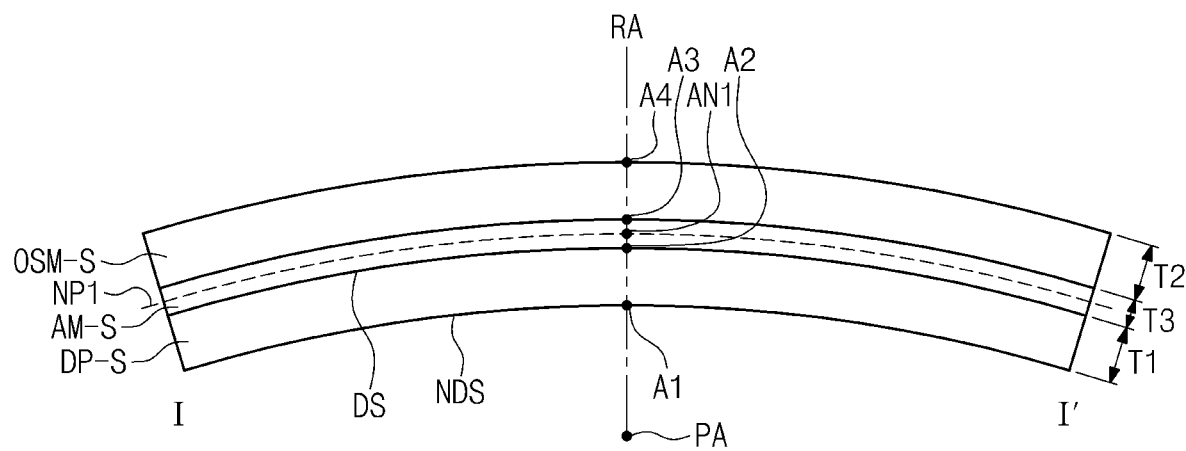
FIGS. 5A and 5B are cross-sectional views showing a neutral plane occurring in flexible display devices when the flexible display devices are bent.
Figure 5B:
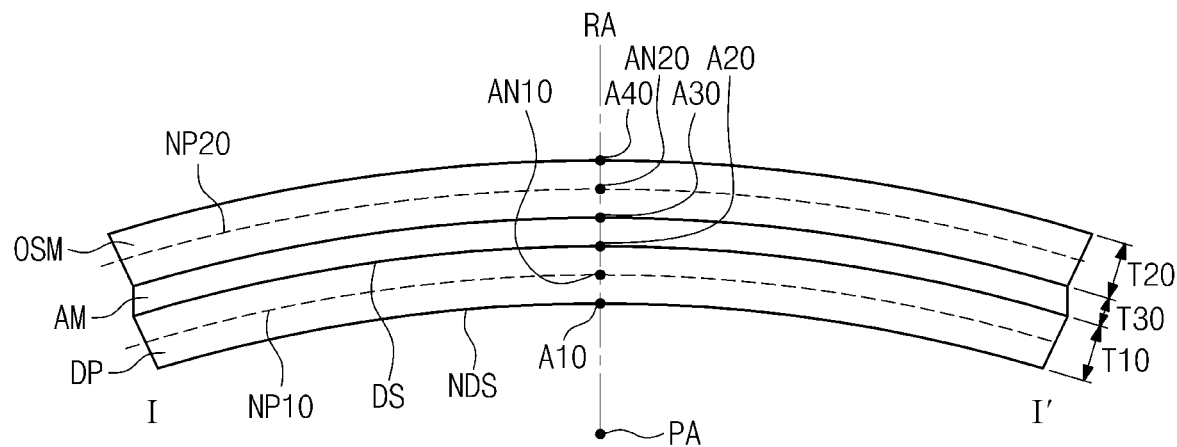
Figure 6:
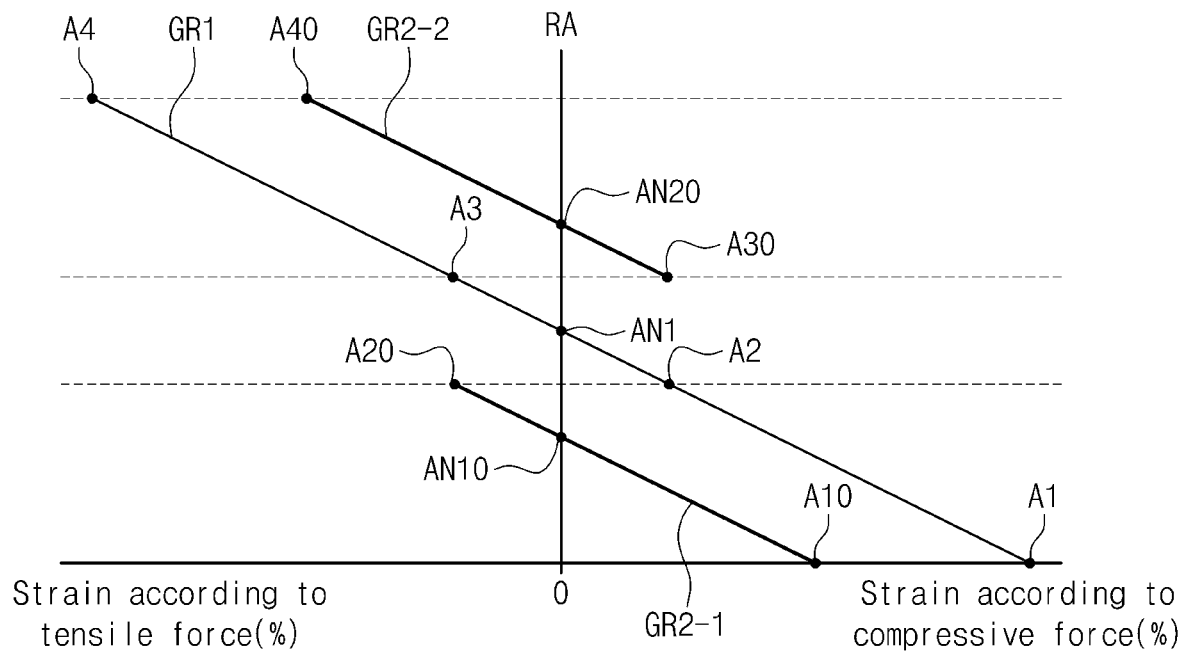
FIG. 6 is a graph showing strain of the flexible display devices shown in FIGS. 5A and 5B.

FIGS. 5A and 5B are cross-sectional view showing neutral planes occurring in flexible display devices, when the flexible display devices are bent. FIG. 6 is a graph showing strain applied to the flexible display devices shown in FIGS. 5A and 5B. Hereinafter, a relation between a ratio of the elastic modulus of the adhesive member AM to the elastic modulus of the display panel DP and the outer member OSM, and a strain of the display device will be described with reference to FIGS. 5A and 5B and 6.

FIGS. 5A and 5B show the cross-sectional views corresponding to the line I-I' shown in FIG. 1, of a comparative display device and an exemplary display device. In addition, FIGS. 5A and 5B show the display devices bent such that different portions of the non-display surface NDS become closer to each other. FIGS. 5A and 5B show the bending axis PA and a reference line RA extending from the bending axis PA and vertical to the display surface DS. The bending direction of the display device should not be limited thereto or thereby, and thus the display device may be bent such that different portions of the non-display surface NDS become adjacent to each other.

An adhesive member AM-S of the comparative display device shown in FIG. 5A has an elastic modulus exceeding about 1/1000 of the elastic modulus of each of the display panel DP-S and the outer member OSM-S. The comparative display device includes the adhesive member AM-S having the elastic modulus of about 1/100 of the elastic modulus of each of the display panel DP-S and the outer member OSM-S.

The adhesive member AM of the exemplary display device shown in FIG. 5B has the elastic modulus smaller than about 1/1000 of the elastic modulus of each of the display panel DP and the outer member OSM. The exemplary display device includes the adhesive member AM having the elastic modulus of about 1/10000 of the elastic modulus of each of the display panel DP and the outer member OSM. The display panel DP has the elastic modulus of about 6 GPa, the outer member OSM has the elastic modulus of about 5 GPa, and the adhesive member AM has the elastic modulus of about 0.5 MPa.

When the comparative display device is bent, one neutral plane NP1 occurs. On the neutral plane NP1, a compressive force occurring in the display device is equal to a tensile stress occurring in the display device. Since the elastic modulus of the adhesive member AM-S is relatively greater than that of the display panel DP-S and the outer member OSM-S, the display device is bent as a one-piece member.

The comparative display device has a predetermined curvature ratio Rb when being bent. When the exemplary display device has a predetermined thickness Tt, the exemplary display device has the strain (S) represented by the following Equation. The thickness Tt of the exemplary display device is equal to a sum of thicknesses T1, T2, and T3 of the display panel DP-S, the outer member OSM-S, and the adhesive member AM-S.

$$S = \frac{\pi(Rb + Tt/2) - \pi Rb}{\pi Rb} - \frac{Tt}{2Rb} \qquad \text{Equation}$$

When the exemplary display device is bent, neutral planes NP10 and NP20 are formed. Different neutral planes NP10 and NP20 occur in the display panel DP and the outer member OSM. This is because the display panel DP and the outer member OSM are partially separated from each other by the stress applied to the adhesive member AM, when the exemplary display device is bent. Although not shown in figures, a neutral plane may occur in the adhesive member AM.

The display panel DP and the outer member OSM have independent strains applied thereto. The display panel DP has a strain corresponding to the thickness T10 thereof, and the outer member OSM has a strain corresponding to the thickness T20 thereof. The display panel DP and the outer member OSM each have a small amount of strain in consideration of the thickness Tt of the display device.

In the present exemplary embodiment, the thickness T10 of the display panel DP is in a range from about 30 micrometers to about 40 micrometers, the thickness T20 of the outer member OSM is in a range from about 40 micrometers to about 120 micrometers, and the thickness T30 of the adhesive member AM is in a range from about 20 micrometers to about 100 micrometers. The thickness T20 of the outer member OSM varies depending on its type.

FIG. 6 shows a first graph GR1 representing the strain of the comparative display device shown in FIG. 5A and second graphs GR2-1 and GR2-2 representing the strain of the exemplary display device shown in FIG. 5B. The first graph GR1 and the second graphs GR2-1 and GR2-2 represent the strain with respect to the reference lines RA.

According to the first graph GR1, the outer member OSM-S of the comparative display device has a relatively large strain, according to the tensile force, and the display panel DP-S has the relatively large strain, according to the compressive force. According to the second graphs GR2-1 and GR2-2, the strain of the exemplary display device, according to the tensile force and the compressive force, are smaller than those of the comparative display device. As represented by points A1, A2, A3, and A4 of the first graph GR1, and points A10, A20, A30, and A40 of the second graphs GR2-1 and GR2-2, the strain occurring in the exemplary display device is smaller than that of the comparative display device, at corresponding points.

Although the exemplary display device is bent, the strain applied to the display panel DP is relatively small, and thus, internal components, e.g., the driving thin film transistor TR-D and/or the organic light emitting diode OLED of the display panel DP are not damaged. In addition, the display panel DP and the outer member OSM are not physically separated from each other.

According to another exemplary embodiment, when the display devices are bent in an opposite direction, the first graph GR1 and the second graphs GR2-1 and GR2-2 are left and right reversed with respect to the reference line RA.

Figure 7:
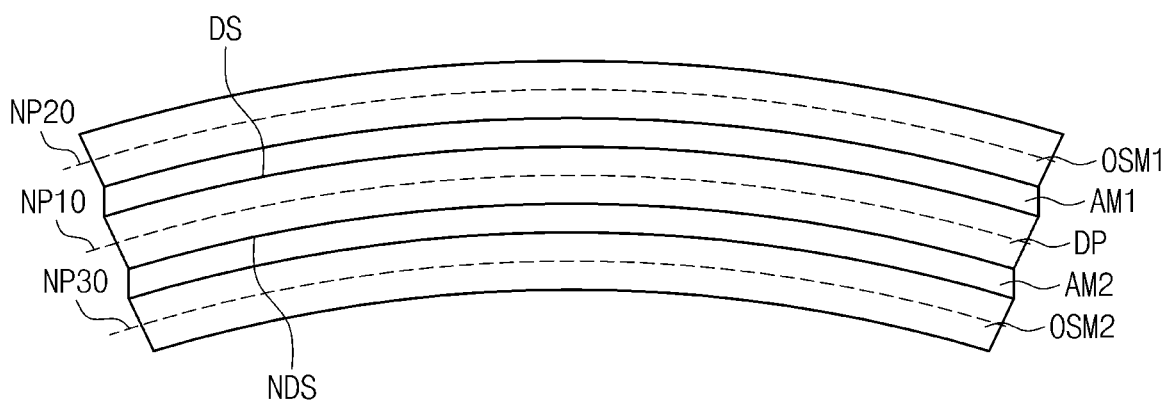
FIG. 7 is a cross-sectional view showing a flexible display device according to an exemplary embodiment of the present disclosure.

FIG. 7 is a cross-sectional view showing a flexible display device according to an exemplary embodiment of the present disclosure. In FIG. 7, the same reference numerals denote the same elements in FIGS. 1 to 6, and thus, detailed descriptions of the same elements will be omitted.

Referring to FIG. 7, the display device according to the present exemplary embodiment includes a flexible display panel DP (hereinafter, referred to as a display panel), a first outer member OSM1 disposed on a display surface DS of the display panel DP, and a second outer member OSM2 disposed on a non-display surface NDS of the display panel DP. The display panel DP and the first outer member OSM1 are coupled to each other by a first adhesive member AM1. The display panel DP and the second outer member OSM2 are coupled to each other by a second adhesive member AM2.

The first outer member OSM1 may include at least one of a touch screen panel, an optical member, and a window member. The second outer member OSM2 may include a protective member.

The touch screen panel senses an external input in various ways, such as an electrostatic capacitive mode, a resistive mode, an electromagnetic induction mode, etc. The optical member includes a polarization member and a phase difference compensation member. The touch screen panel and the optical member are integrally formed as a single unit. The polarization member and the phase difference compensation member form a base substrate of the touch screen panel.

In the present exemplary embodiment, the touch screen panel has a thickness of about 40 micrometers to about 60 micrometers, and the optical member has a thickness of about 70 micrometers to about 120 micrometers. The touch screen panel has an elastic modulus of about 2 GPa to about 3 GPa and the optical member has an elastic modulus of about 4 GPa to about 5 GPa.

The window member may be a flexible plastic film or a thin glass substrate. The window member may have a multi-layer structure. In addition, a functional layer is coated on an outer surface of the window member. The functional layer includes at least one of an anti-fingerprint coating, an anti-reflection coating, an anti-glare coating, and a hard coating. The window member has a thickness of about 50 micrometers to about 100 micrometers and an elastic modulus of about 3 GPa to about 6 GPa.

The protective member may be, for example, a flexible plastic film. The protective member may have a multi-layer structure. The protective member may have a thickness of about 25 micrometers to about 100 micrometers and an elastic modulus of about 6 GPa to about 7 GPa.

When the display device is bent, neutral planes NP10, NP20, and NP30 are formed. The neutral planes NP10, NP20, and NP30 are respectively defined in the display panel DP, the first outer member OSM1, and the second outer member OSM2. When the display panel is bent, the display panel DP and the first outer member OSM1 are partially decoupled from each other by the stress applied to the first adhesive member AM1, and the display panel DP and the second outer member OSM2 are partially decoupled from each other by the stress applied to the second adhesive member AM1.

FIGS. 8A to 8F are cross-sectional views showing flexible display devices according to exemplary embodiments of the present disclosure. The display devices shown in FIGS. 8A to 8F have different layer structures from each other. In FIGS. 8A to 8F, the same reference numerals denote the same elements in FIGS. 1 to 7, and thus, detailed descriptions of the same elements will be omitted.

Figure 8A:
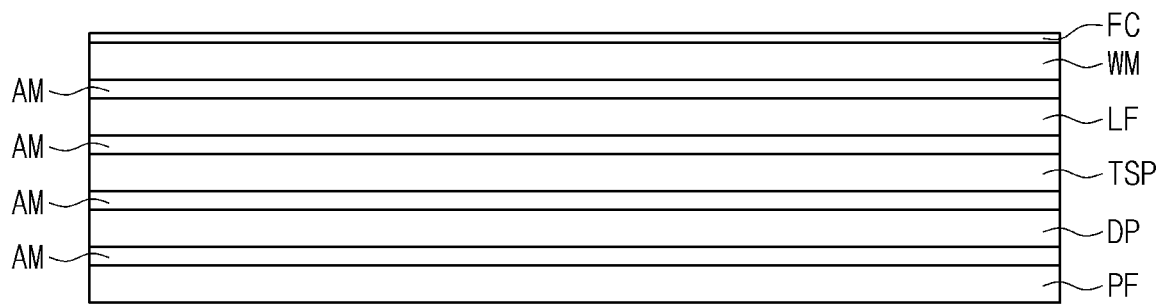
FIGS. 8A to 8F are cross-sectional views showing flexible display devices according to exemplary embodiments of the present disclosure.

Referring to FIG. 8A, the display device includes a display panel DP, a protective PF disposed on a non-display surface NDS of the display panel DP, and a touch screen panel TSP, an optical member LF, and a window member WM, which are sequentially stacked on the display surface DS. A functional layer FC is disposed on an upper surface of the window member WM.

Among the protective member PF, the display panel DP, the touch screen panel TSP, the optical member LF, and the window member WM (members hereinafter), adhesive members AM are disposed. The adhesive members AM couple adjacent members to each other.

The adhesive members AM have an elastic modulus of about $1/1000000$ to about $1/1000$ of the elastic modulus of the members connected thereby. When the display device is bent, a neutral plane occurs in each of the members. Each of the members has the strain corresponding to its thickness. Accordingly, although the thickness of the display device increases, the strain of each of the protective member PF, the display panel DP, the touch screen panel TSP, the optical member LF, and the window member WM is not varied substantially.

Figure 8B:
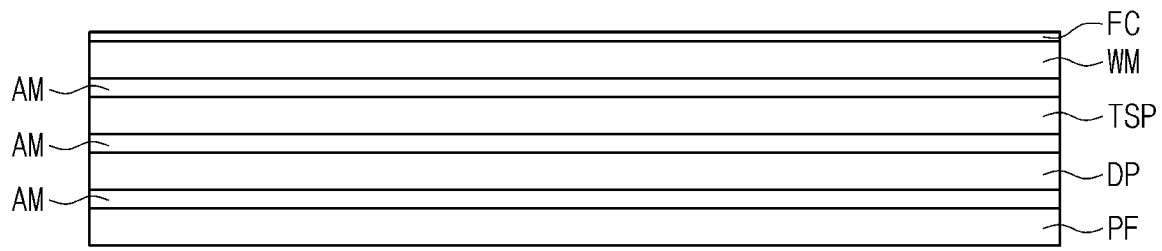
Figure 8C:
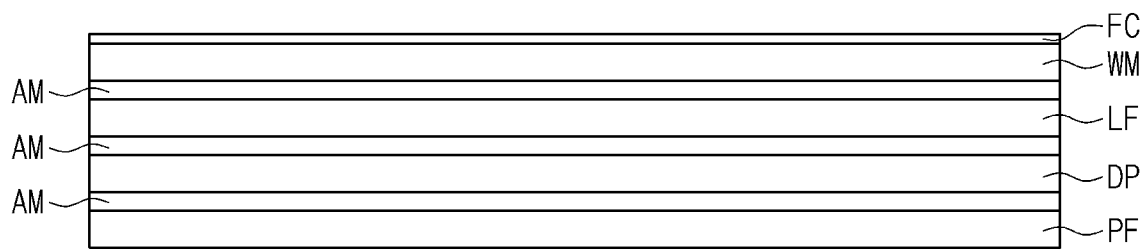
Figure 8D:
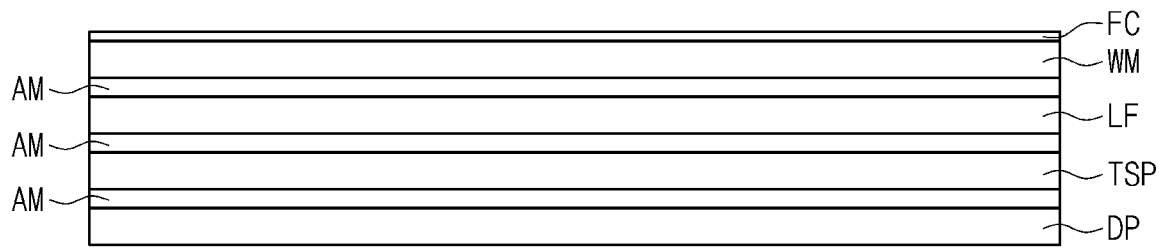
Figure 8E:
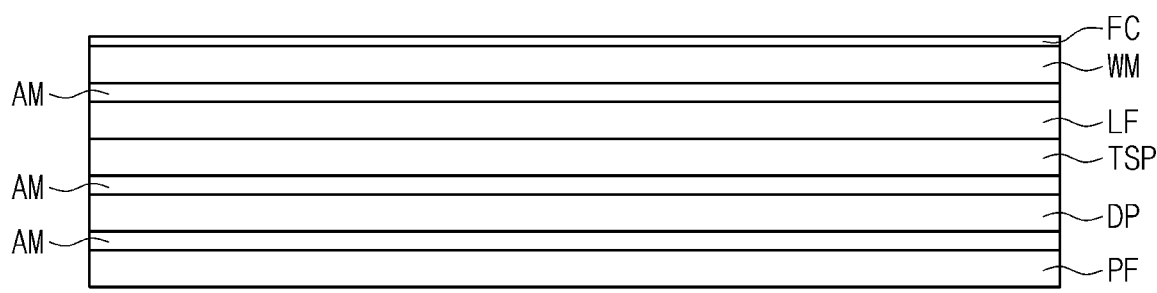
Figure 8F:
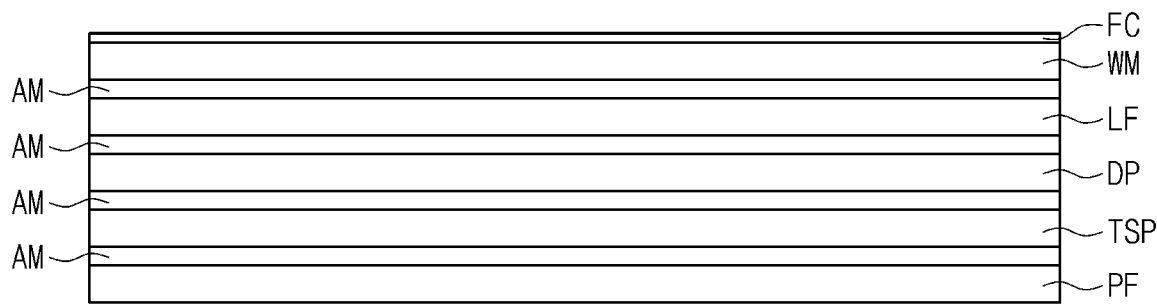

FIG. 8B shows the display device shown in FIG. 8A, from which the optical member LF is removed, FIG. 8C shows the display device shown in FIG. 8A, from which the touch screen panel TSP is removed, and FIG. 8D shows the display device shown in FIG. 8, from which the protective member PF is removed. FIG. 8E show the display device shown in FIG. 8A, in which the optical member LF is integrated in the touch screen panel TSP. FIG. 8F shows the display device shown in FIG. 8A, in which a position of the touch screen panel TSP is changed.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A flexible display device comprising:
   a flexible display panel;
   a flexible outer member disposed on the flexible display panel; and
   an adhesive member disposed between the flexible display panel and the flexible outer member and bonding the flexible outer member to the flexible display panel, wherein:
   an elastic modulus of the adhesive member is in a range of 0.01 MPa to 1 MPa;
   an elastic modulus of the flexible display panel is in a range of 1 GPa to 10 GPa;

an elastic modulus of the flexible outer member is in a range of 2 GPa to 7 GPa; and when the flexible display device is bent, stress is applied to the adhesive member so as to at least partially decouple a first neutral plane formed in the flexible display panel and a second neutral plane separate from the first neutral plane formed in the flexible outer member.

2. The flexible display device of claim 1, wherein the flexible outer member comprises a protective member disposed on a non-display surface of the display panel, the non-display surface opposing the display surface.

3. The flexible display device of claim 1, wherein the flexible display device is configured to bend.

4. A flexible display device comprising:
a flexible display panel;
a flexible outer member disposed on the flexible display panel; and
an adhesive member disposed between the flexible display panel and the flexible outer member, wherein:

an elastic modulus of the adhesive member is in a range of 0.01 MPa to 1 MPa;
an elastic modulus of the flexible display panel is in a range of 1 GPa to 10 GPa;
an elastic modulus of the flexible outer member is in a range of 2 GPa to 7 GPa;
the adhesive member comprises a pressure sensitive adhesive sheet that comprises a polymer, a cross-linking agent, and a resin;
the polymer comprises a silicon-based polymer, a urethane-based polymer, or any combination thereof; and
when the flexible display device is bent, stress is applied to the adhesive member so as to at least partially decouple a first neutral plane formed in the flexible display panel and a second neutral plane separate from the first neutral plane formed in the flexible outer member.

5. The flexible display device of claim 4, wherein the flexible display device is configured to bend.

* * * * *